United States Patent
Hashimoto

(10) Patent No.: US 7,450,811 B2
(45) Date of Patent: Nov. 11, 2008

(54) OPTICAL WAVEGUIDE DEVICE AND OPTICAL MODULATOR

(75) Inventor: Naoki Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/588,411

(22) Filed: Oct. 27, 2006

(65) Prior Publication Data

US 2007/0297737 A1    Dec. 27, 2007

(30) Foreign Application Priority Data

Jun. 12, 2006    (JP) .............................. 2006-161724

(51) Int. Cl.
*G02B 6/10* (2006.01)
(52) U.S. Cl. ........................ 385/129; 385/130; 385/131
(58) Field of Classification Search .......... 385/129–131
See application file for complete search history.

(56) References Cited

U.S. PATENT DOCUMENTS 6,519,379 B1 *    2/2003    Izawa et al. ................... 385/14

7,133,578 B2 *    11/2006    Doi ................................ 385/3

OTHER PUBLICATIONS

"Optical Integrated Circuit (revised and enlarged edition)"pp. 281-283, by Hiroshi Nishihara et al., Ohmsha, Aug. 20, 1993.
Max Born et al., "Electromagnetic Theory of Propagation, Interference and Diffraction of Light,". Principles of Optics, sixth edition, Pergamon Press, pp. 704-709, Issue date 1980.

* cited by examiner

*Primary Examiner*—Jennifer Doan
(74) *Attorney, Agent, or Firm*—Staas & Halsey LLP

(57) ABSTRACT

In an optical waveguide device according to the present invention, a multi-layer cladding which is formed by laminating one or more high refractive index layers having the refractive index higher than that of a core and one or more low refractive index layers having the refractive index lower than that of the core, is disposed on a substrate on which an optical waveguide is formed, and utilizing the structural birefringence of this multi-layer cladding, the polarization-dependence of the optical waveguide is increased. As a result, it becomes possible to provide the optical waveguide device having a simple optical waveguide structure for selectively attenuating one of polarization modes of a propagated light.

13 Claims, 17 Drawing Sheets

EFFECTIVE REFARCTIVE INDEX OF Si-SiO$_2$ MULTI-LAYER FILM
(OPTICAL WAVELENGTH: 1550nm)

TWO-DIMENSIONAL SLAB MODEL

SIMULATION RESULT FOR MULTI-LAYER CLADDING
(Si:SiO$_2$=0.5:0.5, D=100nm)

SIMULATION RESULT FOR MULTI-LAYER CLADDING
(Si:SiO$_2$=0.25:0.75, D=100nm)

ENLARGED VIEW OF CLADDING PORTION IN FIG. 6 AND FIG. 8

THREE-LAYER SLAB WAVEGUIDE

LEAKAGE AMOUNT OF LIGHT
(PROVIDED THAT INTEGRAL VALUE OF ELECTRIC FIELD DISTRIBUTION IS 1)

DEFINITION OF LEAKAGE AMOUNT

CASE OF CLADDING OF ONE CYCLE (TWO-LAYER)

CASE OF CLADDING OF $SiO_2$ SINGLE-LAYER FILM

CASE OF ASSUMING SINGLE-LAYER CLADDING
HAVING EFFECTIVE REFRACTIVE INDEX (2.12) OF MULTI-LAYER FILM
OF INFINITE THICKNESS (THICKNESS OF 200nm)

FIRST EMBODIMENT

FIRST EMBODIMENT

SECOND EMBODIMENT

SECOND EMBODIMENT

THIRD EMBODIMENT

FOURTH EMBODIMENT

PLAN VIEW

A-A CROSS SECTION VIEW

MODULATOR PORTION — POLARIZER POTION

MODULATOR PORTION — POLARIZER POTION

OPTICAL WAVEGUIDE DEVICE AND OPTICAL MODULATOR

BACKGROUND OF THE INVENTION

1. Field of the Invention

The present invention relates to an optical waveguide device and an optical modulator used for an optical communication, and in particular, to an optical waveguide device and an optical modulator, each of which is provided with a function as a polarizer.

2. Description of the Related Art

At the present day, there are realized variety types of optical transmission systems each using an optical waveguide device provided with various functions in optical communications. For example, in an optical transmission system of high-speed and long-distance, an optical modulator is widely used, in which an optical waveguide, an electrode and the like are formed on a lithium niobate ($LiNbO_3$; LN) substrate being electro-optic crystal or the like.

FIG. 29 shows one example of a structure of typical LN optical modulator. In this LN optical modulator, an electrode is arranged on two arms of a Mach-Zehnder interferometer (MZI) type waveguide, and a phase difference between two waveguides is controlled according to a voltage applied on the electrode, so that the ON/OFF of an output signal can be realized. It is typical that a buffer layer is disposed between the waveguides and the electrode in order to suppress the optical absorption by the electrode. Generally, a drive voltage ($V\pi$) for such an optical modulator is inverse proportion to the electrode length.

In the LN optical modulator as described in the above, since $r_{33}$ is the largest constant among electro-optic constants (tensor) of the $LiNbO_3$ crystal, only a light of which electric field is polarized to a z-axis direction of the crystal (a TE mode in a x-cut substrate, and a TM mode in a z-cut substrate) is utilized. Therefore, it is typical to input the light into the crystal by adjusting a polarized wave of an incident light to the z-axis direction using a polarization-maintaining fiber, for example.

However, it is impossible to avoid that the polarized wave (the TM mode in the x-cut substrate, and the TM mode in the z-cut substrate) orthogonal to the z-axis direction is incident or excited, due to the axis deviation between a modulator chip and an input fiber, the polarization variation of the incident light, the lack of polarization-extinction ratio in the waveguide itself or the like, resulting in the deterioration in polarization-extinction ratio of an output signal. Therefore, in order to improve the quality of modulation signal, it is desirable to integrate a waveguide type polarizer of small size and low cost, which is capable of efficiently eliminating the unnecessary polarization, to the LN optical modulator.

As the waveguide type polarizer for greatly attenuating one of the polarization modes (TE/TM) propagated through the waveguide, there are known the ones by the following methods.

(1) By a Method of Disposing a Metal Film on the Waveguide (Via a Buffer Layer or the Like)

A waveguide type polarizer in which the leakage of the guided mode to a cladding (buffer layer) is utilized, to thereby utilize an effect in that a TM mode excites free electrons in the metal, to be largely attenuated in comparison with a TE mode (refer to the literature 1 "Optical Integrated Circuit (revised and enlarged edition)", pp. 281-283, by Hiroshi NISHIHARA et al., Ohmsha, August 1993).

(2) By a Method of Utilizing a Directional Coupler

A waveguide type polarizer in which a propagation constant difference between the TE mode and the TM mode is utilized, to thereby utilize an optical power transition distance difference between two waveguides.

(3) By a Method of Using a Birefringent Material for a Cladding

A waveguide type polarizer in which a birefringent material is used for a cladding, so that the cladding has the refractive index which is higher than that of a core in one of polarized waves to achieve a radiation mode while being lower than that of the core in the other polarized wave to achieve a waveguide mode (refer to the literature b 1 and the literature 2: Japanese Unexamined Patent Publication No. 8-136753).

(4) By a Method of Using a Proton-Exchange Waveguide

A waveguide type polarizer in which only a TE mode or only a TM mode is propagated depending on a direction of a crystal substrate (refer to the literature 3: Japanese Unexamined Patent Publication No. 7-27935).

(5) By a Method of Using a Resonance Reflection Type Waveguide

A waveguide polarizer in which a low refractive index cladding, a high refractive index cladding and a core (having the refractive index same as that of the low refractive index cladding) are formed on a high refractive index substrate, to thereby confine a light by utilizing the resonance reflection of the high refractive index cladding, so that a high polarization-extinction ratio can be achieved by a film thickness control of the high refractive index cladding or the multi-layering thereof (refer to the literature 4: Japanese Unexamined Patent Publication No. 4-125602).

Each conventional waveguide type polarizer as described in the above can realize the high performance as a stand-alone polarizer. However, the following problems are caused, considering the integration or the unification of each polarizer with an optical waveguide device, such as the optical modulator or the like as described above.

Firstly, with regard to the waveguide type polarizer by the method of (1) or (2), as shown in an upper stage of FIG. 30 for example, since it is required to dispose a polarizer portion of a few millimeters to a few centimeters on an incident port side (or an emission port side) of the optical modulator or the like, the chip length is increased, resulting in the size enlargement of the entire optical modulator or in the loss degradation thereof. Further, if a modulator portion is shortened as shown in a lower stage of FIG. 30 in order to retain the chip length at the fixed length, the drive voltage is increased. In the case where the waveguide type polarizer by the method of (1) or (2) is used, to thereby realize the improvement of the polarization-extinction ratio of the optical waveguide device, such as the optical modulator or the like, there is a problem in that the various characteristics (for example, the chip length, an insertion loss, the drive voltage and the like) of the conventional optical waveguide device are degraded.

With regard to the waveguide type polarizer by the method of (3), if the birefringent material can be used for the cladding of the optical waveguide device, such as the optical modulator or the like, since the structure itself of the optical modulator or the like functions as the polarizer, it is possible to improve the polarization-extinction ratio without the degradation of the various characteristics as described above. However, considering the LN optical modulator for example, in an actual situation, there has not been known a material indicating the appropriate birefringence in the vicinity of the refractive index of LiNbO$_3$. Even if such a material is obtained, it is necessary to match an orientation of the birefringent material to be used for the cladding with the crystal direction of the LiNbO$_3$ substrate with high precision, and therefore, there is a problem in that such a waveguide is hard to be practically produced. Note, in the literature 2, there is proposed a technology for controlling the film producing process of the buffer layer to apply the stress on the buffer layer, thereby providing the anisotropy for the refractive index. However, there is a drawback in that the producing process becomes complicated, resulting in the cost increase.

With regard to the waveguide type polarizer by the method of (4), there is a problem in that the drive voltage (Vπ) is relatively high in the optical modulator to which the proton-exchange waveguide is applied.

With regard to the waveguide type polarizer by the method of (5), the structure of the waveguide is complicated, and a leakage amount (polarization-extinction ratio) of one of the polarization mode lights greatly depends on the film thickness of the cladding. Therefore, the film thickness control is significantly difficult, causing a problem in the producing performance.

SUMMARY OF THE INVENTION

The present invention has been accomplished in view of the above problems, and has an object to provide an optical waveguide device having a simple optical waveguide structure capable of selectively attenuating one of orthogonal polarization modes of a light propagated through an optical waveguide. Further, the present invention has an object to provide an optical modulator which is applied with the above optical waveguide structure, to thereby realize a high polarization-extinction ratio.

In order to achieve the above objects, a device according to the present invention which is provided with an optical waveguide comprising: a core which is formed on a substrate and has the relatively high refractive index; and a cladding which is arranged so as to cover the core and has the relatively low refractive index, wherein the optical waveguide device includes, on a part of the cladding, a multi-layer structure portion which is formed by laminating, in a direction away from the core, one or more low refractive index layers formed using a material of the refractive index lower than that of the core and one or more high refractive index layers formed using a material of the refractive index higher than that of the core, and a lamination cycle of the low refractive index layer and the high refractive index layer in the multi-layer structure portion is set to be shorter than a distance to which a polarization mode for guiding the core leaks out to a single-layer cladding on the assumption that the single-layer cladding is formed using the material constituting the low refractive index layer. In the device having such a configuration, by disposing the multi-layer structure portion on the part of the cladding, the optical waveguide of large polarization dependence is realized due to the structural birefringence of the multi-layer structure portion.

Further, as a specific configuration of the above device, the lamination cycle of the low refractive index layer and the high refractive index layer in the multi-layer structure portion of the cladding, and a film thickness ratio thereof, may be set so that the effective refractive index to one of orthogonal polarization modes of the light incident on the optical waveguide is lower than the refractive index of the core and the effective refractive index to the other polarization mode is higher than the refractive index of the core. Otherwise, the configuration may be such that the lamination cycle of the low refractive index layer and the high refractive index layer, and the film thickness ratio thereof, may be set so that the effective refractive index to each of the orthogonal polarization modes of the light incident on the optical waveguide is lower than the refractive index of the core, and an optical absorber is provided in the vicinity of an end face of the multi-layer structure portion, which is positioned on an opposite side of the core. In the above configuration, a loss to the one polarization mode of the light being propagated through the optical waveguide is not increased, and the other polarization mode is attenuated due to a radiation loss, an absorption loss or the like.

An optical modulator according to the present invention comprises: a substrate having an electro-optic effect; an optical waveguide comprising a core which is formed on the substrate and has the relatively high refractive index, and a cladding which is arranged so as to cover the core and has the relatively low refractive index; an electrode arranged in the vicinity of the optical waveguide; and a buffer layer which is arranged between the optical waveguide and the electrode to suppress the optical absorption by the electrode, for modulating a light being propagated through the optical waveguide due to the electro-optic effect caused by a drive voltage applied on the electrode, wherein the buffer layer has a multi-layer structure in which one or more low refractive index layers formed using a material of the refractive index lower than that of the core and one or more high refractive index layers formed using a material of the refractive index higher than that of the core are laminated in a direction toward the electrode from the core, and a lamination cycle of the low refractive index layer and the high refractive index layer in the multi-layer structure is set to be shorter than a distance to which a polarization mode for guiding the core leaks out to a single-layer buffer on the assumption that the single-layer buffer is formed using the material constituting the low refractive index layer. In the optical modulator having such a configuration, since the buffer layer between the optical waveguide and the electrode is made to have the multi-layer structure by the lamination of the low refractive index layers and the high refractive index layers, the optical waveguide of large polarization dependence is realized due to the structural birefringence of the buffer layer of the multi-layer structure, and the improvement of polarization-extinction ratio is achieved.

As described in the above, according to the optical waveguide device of the present invention, it is possible to increase the polarization dependence of the leakage of the light being propagated through the optical waveguide out to the cladding, by utilizing the structural birefringence of the multi-layer structure portion of the cladding. Therefore, it becomes possible to, without increasing the loss to the one polarization mode of the propagated light, selectively attenuate the other polarization mode.

By making the buffer layer between the optical waveguide and the electrode to have the multi-layer structure by applying the above optical waveguide structure to the optical modulator, since the structure itself of the optical modulator is provided with a function as a polarizer, it becomes possible to improve a polarization-extinction ratio of a modulated signal. Further, the above optical modulator can be produced utilizing the process similar to the conventional process, and also there is no need to extend the chip length. Therefore, there is no possibility of an excess loss in the guided mode or an increase of drive voltage.

Other objects, features and advantages of the present invention will become apparent from the following explanation of the embodiments, in conjunction with the appended drawings.

DESCRIPTION OF THE PREFERRED EMBODIMENTS

Figure 1:
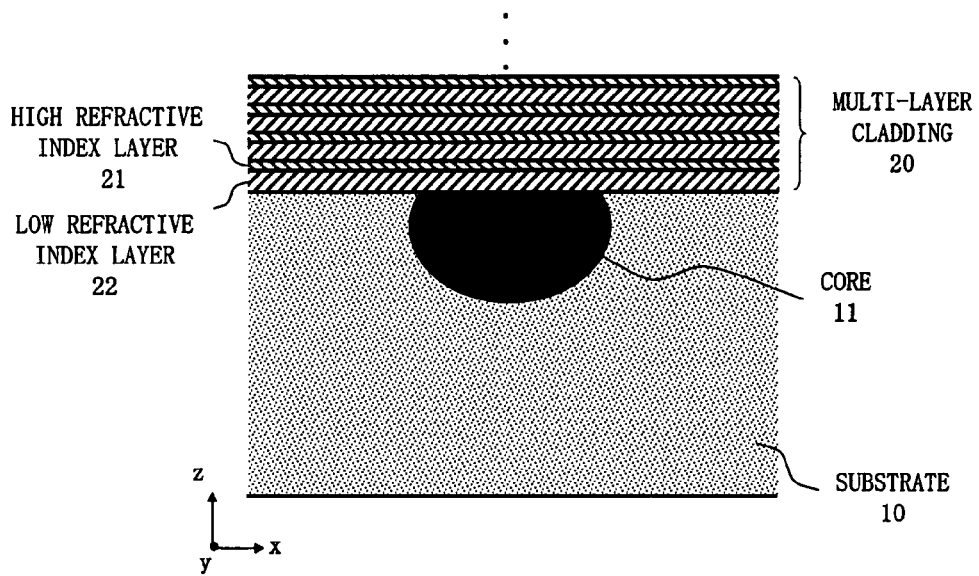
FIG. 1 is a cross section view showing an essential part configuration of one embodiment of an optical waveguide device according to the present invention.

There will be described embodiments for implementing the present invention, with reference to the accompanying drawings. The same reference numerals denote the same or equivalent parts in all drawings.

FIG. 1 is a cross section view showing an essential part configuration of one embodiment of an optical waveguide device according to the present invention.

In FIG. 1, the present optical waveguide device comprises, for example: a substrate 10 which is formed with a core 11 in the vicinity of a surface thereof; and a multi-layer cladding 20 formed on the surface of the substrate 10. The multi-layer cladding 20 is formed such that a high refractive index layer 21 formed using a material of the refractive index higher than that of the core 11 and a low refractive index layer 22 formed using a material of the refractive index lower than that of the core 11 are laminated in one cycle (two layers) or more in accordance with a previously set lamination cycle and a previously set film thickness ratio. Such a multi-layer cladding 20 is formed in a state of being in contact with the core 11, so that the polarization dependence of an optical waveguide can be greatly increased. Note, herein, as shown in the lower left side of FIG. 1, the consideration is made on an orthogonal coordinate system in which a height direction of the substrate 10 is the z-axis and a propagation direction of a light within the core 11 is the y-axis.

Here, there will be described the principle in which the polarization dependence of the optical waveguide is increased by the multi-layer cladding 20.

Generally, with regard to a light traveling in parallel to a lamination direction of a multi-layer film, the refractive index sensed by the light is different between a polarized component of which electric field is in parallel to a lamination plane (for example, a TE mode) and a polarized component of which electric field is vertical to the lamination plane (for example, a TM mode). This characteristic is called the structural birefringence.

Figure 2:
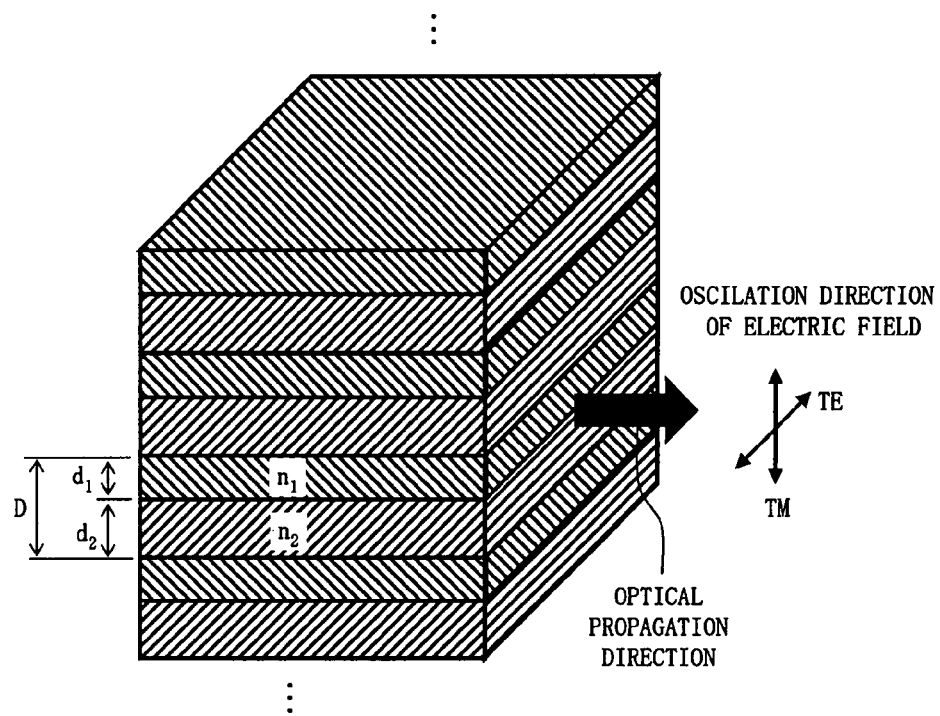
FIG. 2 is a diagram for explaining the structural birefringence in multi-layers.

To be specific, as shown in FIG. 2 for example, the consideration is made on the structural birefringence for the case where a first layer formed of a material of the refractive index $n_1$ and a second layer formed of a material of the refractive index $n_2$ are laminated in a cycle of possession rate $f_1:f_2(f_1+f_2=1)$. In this case, provided that the film thickness of each of the first and second layers is $d_1$ and $d_2$, a lamination cycle D equals $d_1+d_2$ and in the above possession rate, $f_1=d_1/D$ and $f_2=d_2/D$. Further, it has been known that, when the lamination cycle D is sufficiently small relative to an optical wavelength, the effective refractive indexes $n_{TE}$ and $n_{TM}$ to the respective TE and TM polarization modes can be approximated by the following equation (1), (refer to the literature: "Principles of Optics" by M. Born et al., $6^{th}$ ed., p 705, Pergamon Press. Oxford, 1980).

$$n_{TE} = \sqrt{f_1 n_1^2 + f_2 n_2^2}$$
$$n_{TM} = \left(\sqrt{\frac{f_1}{n_1^2} + \frac{f_2}{n_2^2}}\right)^{-1}$$
(1)

Note, in the case where the lamination cycle D is not sufficiently small relative to the optical wavelength, it is difficult to lead the typical equation as described above. However, it is possible to obtain the effective refractive indexes to the respective polarization modes by a method of obtaining a propagation constant of a light wave being propagated through a multi-layer film or the like.

Figure 3:
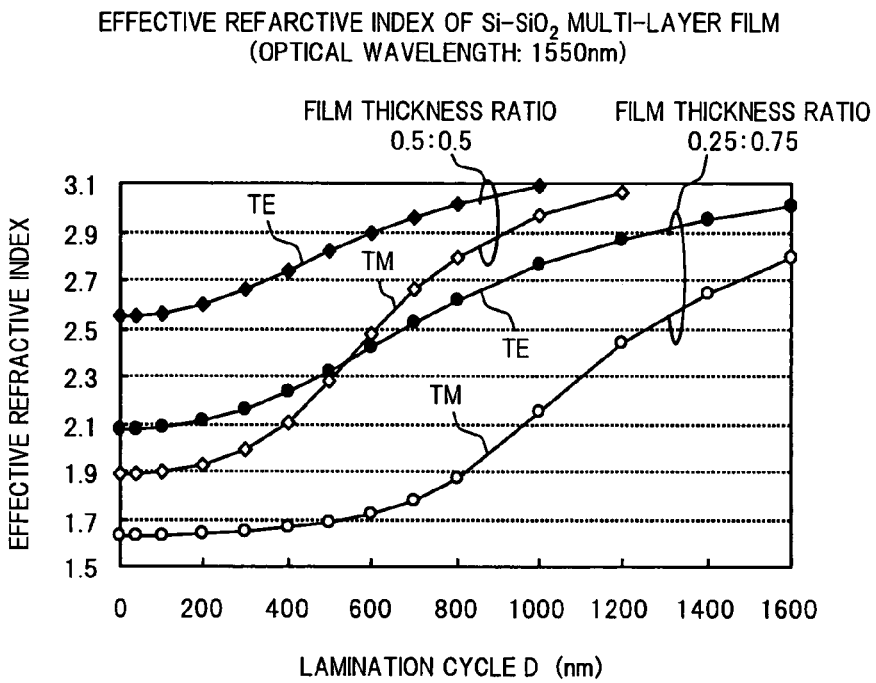
FIG. 3 is a graph showing a relation between the effective refractive index of the multi-layers consisting of Si layers and $SiO_2$ layers and a lamination cycle thereof.

FIG. 3 shows one example in which a relation between the effective refractive indexes to the respective polarization modes and the lamination cycle D in a wavelength of 1550 nm, for the case where a Si layer (the refractive index $n_1=3.3$) and a $SiO_2$ layer (the refractive index $n_2=1.46$) are laminated in the possession rate $f_1:f_2=0.5:0.5$, and for the case where they are laminated in the possession rate $f_1:f_2=0.25:0.75$.

From the relation in FIG. 3, it is understood that, in the case where the lamination cycle D is about 1/10 or less of the optical wavelength, the effective refractive indexes of the multi-layer film are substantially consistent with the values given in the above equation, but as the lamination cycle D is increased, both of the effective refractive indexes to the TE and TM polarization modes are increased. This means that an electric field of the light tends to concentrate to the high refractive index layer as the lamination cycle D is larger. Further, as is apparent from the equation (1) and the relation in FIG. 3, in the multi-layer film, the effective refractive index to the TE mode is higher than that to the TM mode. Furthermore, a difference (birefringence) between the effective refractive indexes to the TE and TM modes is increased, as a refractive index difference between the materials used for the respective layers is larger.

In the present invention, by utilizing characteristics of the above multi-layer film for the cladding of the optical waveguide, materials to be used for the respective layers 21 and 22 of the multi-layer cladding 20 and a film thickness ratio (possession rate) of the respective layers 21 and 22 are appropriately selected, so that, for example, the effective refractive index to the TE mode in the multi-layer cladding 20 is higher than the refractive index of the core 11, and also, the effective refractive index to the TM mode in the multi-layer cladding 20 is lower than the refractive index of the core 11. As a result, the TE mode is cut off and it becomes possible to realize the optical waveguide through which only the TM mode is propagated.

Further, it is possible to select the materials to be used for the respective layers 21 and 22 of the multi-layer cladding 20 and the film thickness ratio (possession rate) of the respective layers 21 and 22, so that both of the effective refractive indexes to the TE and TM modes in the multi-layer cladding 20 are lower than the refractive index of the core 11 (refer to FIG. 3). In this case, although waveguide modes exist for both of the polarization modes, since the effective refractive index to the TE mode is higher than that to the TM mode ($n_{TE}>n_{TM}$) in the multi-layer cladding 20, a confining effect of the TE mode in the optical waveguide is weaker than that of the TM mode. Thus, the TE mode largely leaks out to the multi-layer cladding 20 in comparison with the TM mode. By utilizing this leakage to arrange an optical absorber such as a metal in the vicinity of the multi-layer cladding 20, it becomes possible to selectively attenuate only the TE mode in the two modes being propagated.

Incidentally, as the optical waveguide utilizing the structural birefringence of the multi-layer film, there has been known the ones disclosed in Japanese Unexamined Patent Publication No. 5-100124 and Japanese Unexamined Patent Publication No. 2001-221924. However, each of these optical waveguides is for utilizing (or controlling) the birefringence of the waveguide mode by making the core to have the multi-layer structure, and therefore, is different in the basic structure from the present invention in which the cladding is made to have the multi-layer structure, thereby utilizing the polarization dependence of a field distribution profile.

Figure 4:
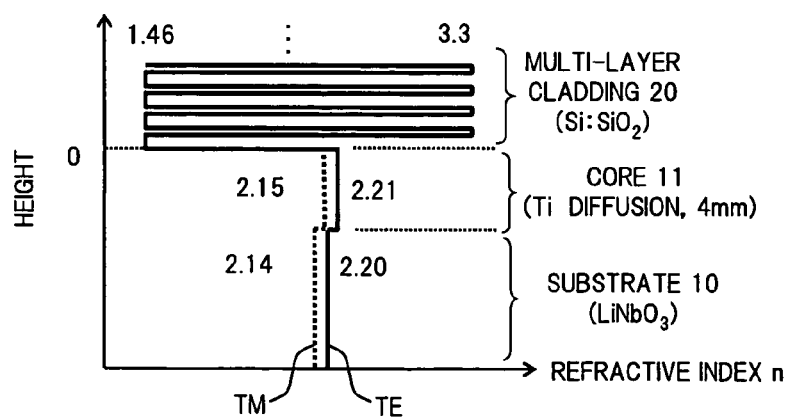
FIG. 4 is a graph showing a change of refractive index in a two-dimensional slab model for when a multi-layer cladding consisting of Si layers and $SiO_2$ layers is disposed on a LN optical waveguide.

In order to make the further specific explanation on the optical waveguide device to which is applied the multi-layer cladding 20 according to the present invention as described above, as shown in FIG. 4 for example, the consideration is made on a two-dimensional slab model for the case where, on the optical waveguide in which the core 11 is formed by the Ti diffusion on the $LiNbO_3$ substrate 10 of z-cut, the multi-layer cladding 20 consisting of the Si layers 21 and the $SiO_2$ layers 22 is disposed so that the lowermost layer is the $SiO_2$ layer 22.

Herein, the refractive indexes of the $LiNbO_3$ substrate 10 are made to be $n_{TM}=2.14$ and $n_{TE}=2.20$, and the refractive indexes of the core 11 (Ti diffused portion) are made to be $n_{TM}=2.15$ and $n_{TE}=2.21$. Further, the thickness of the core 11 is 4 μm. Furthermore, in the multi-layer cladding 20, the refractive index of the Si layer 21 is made to be $n_1=3.3$ and the refractive index of the $SiO_2$ layer 22 is made to be $n_2=1.46$. Moreover, the thickness of the Si layer 21 and the possession rate thereof are represented by d1 and $f_1=d_1/D$, and the thickness of the $SiO_2$ layer 22 and the possession rate thereof are represented by $d_2$ and $f_2=d_2/D$.

In the above two-dimensional slab model, since it is supposed that the $LiNbO_3$ substrate is to be used, the substrate 10 and the core 11 each has the birefringence. However, in the present invention, it is also possible to use a substrate without the birefringence. Further, since the refractive index of the core 11 after the Ti diffusion and the thickness (or the width) of the core 11 are changed depending on a producing condition, the above values are adopted only as one example.

Firstly, as a first setting condition, the consideration is made on the case of assuming the multi-layer cladding 20 having the sufficient thickness in which the possession rates of the Si layer 21 and the $SiO_2$ layer 22 are $f_1:f_2=0.5:0.5$ and the lamination cycle is D=100 nm (namely, the repetitive lamination of the Si layer of 50 nm thickness and the $SiO_2$ layer of 50 nm thickness). In this case, the effective refractive indexes obtained from the equation (1) are $n_{TE}=2.55$ and $n_{TM}=1.88$. Thus, it is expected that since the effective refractive index of the multi-layer cladding 20 to the TE mode is higher than the refractive index of the core 11, the TE mode is cut off, and further, since the effective refractive index of the multi-layer cladding 20 to the TM mode is lower than the refractive index of the core 11, a waveguide condition is satisfied.

Figure 5:
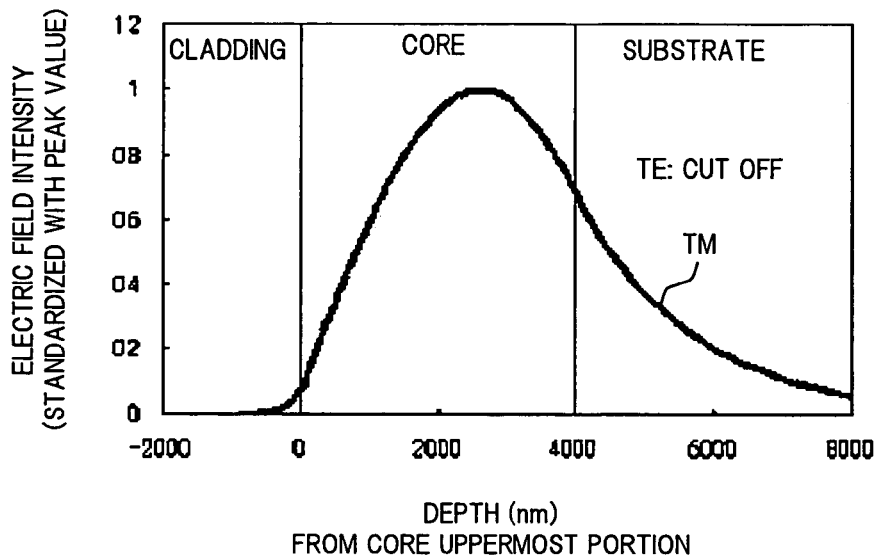
FIG. 5 is a graph showing a simulation result of field distribution profile of a light being propagated through an optical waveguide for a first setting condition of the multi-layer cladding.

FIG. 5 shows a simulation result of the field distribution profile of the light being propagated through the optical waveguide in the above first setting condition. Note, in FIG. 5, the horizontal axis indicates the depth from the uppermost portion (an interfacial boundary to the cladding) of the core 11, and the vertical axis indicates the electric field intensity standardized with a peak value. In the simulation result of FIG. 5, as expected in the above, the optical waveguide is achieved, in which the waveguide mode for the TE mode does not exist, and through which only the TM mode is propagated.

Figure 6:
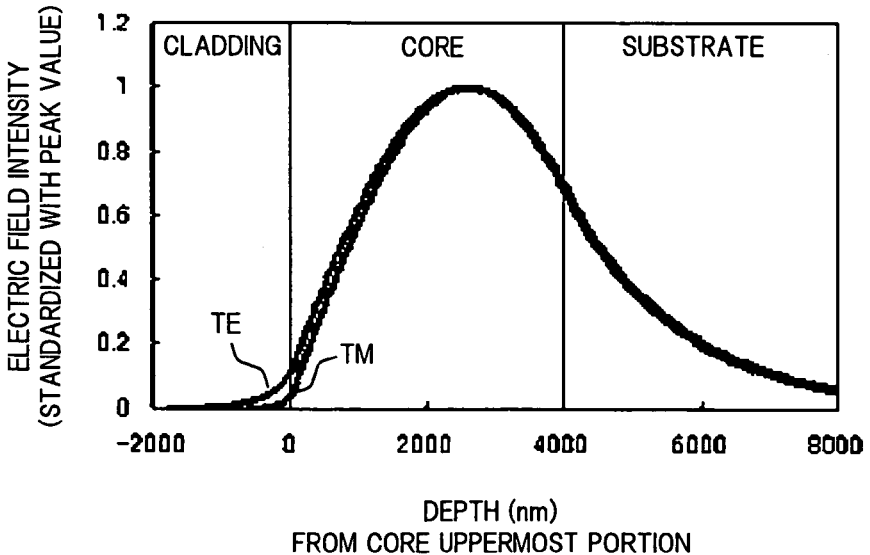
FIG. 6 is a graph showing a simulation result of field distribution profile of the light being propagated through the optical waveguide for a second setting condition of the multi-layer cladding.

Next, as a second setting condition, the consideration is made on the case of assuming the multi-layer cladding 20 having the sufficient thickness in which the possession rates of the Si layer 21 and the $SiO_2$ layer 22 are $f_1:f_2=0.25:0.75$ and the lamination cycle is D=100 nm (namely, the repetitive lamination of the Si layer of 25 nm thickness and the $SiO_2$ layer of 75 nm thickness). Similarly to FIG. 5, FIG. 6 shows a simulation result of the field distribution profile in the second setting condition. In the case of the second setting condition, the effective refractive indexes of the multi-layer cladding 20 obtained from the equation (1) are $n_{TE}=2.08$ and $n_{TM}=1.63$, and since the effective refractive indexes of the multi-layer cladding 20 to both of the polarization modes are lower than the refractive index of the core 11, the waveguide condition is satisfied. However, the confining of the TE mode in the waveguide is weaker than the confining of the TM mode, and therefore, the leakage of the electric field out to the multi-layer cladding 20 is larger in the TE mode than in the TM mode (refer to FIG. 6).

Figure 7:
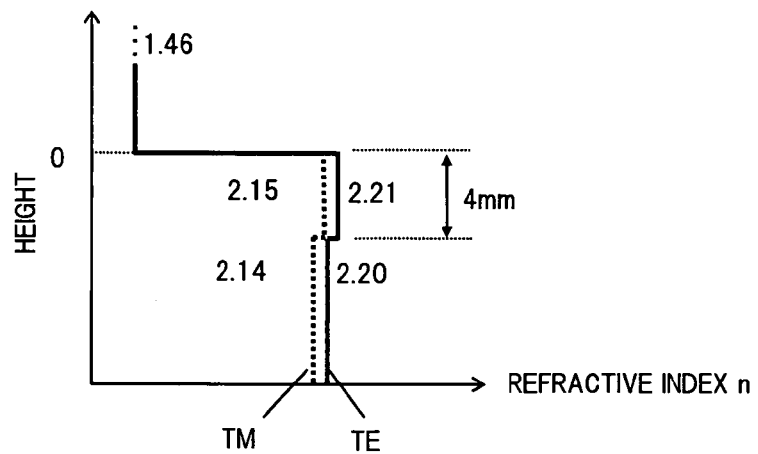
FIG. 7 is a graph showing a change of refractive index in the two-dimensional slab model for when a single-layer cladding of $SiO_2$ is disposed on the LN optical waveguide.
Figure 8:
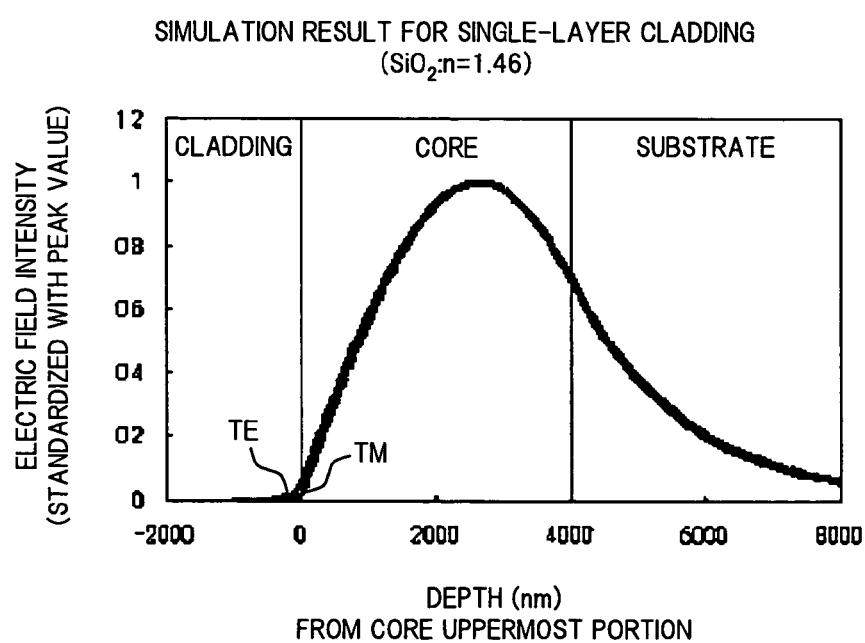
FIG. 8 is a graph showing a simulation result of field distribution profile of the light being propagated through the optical waveguide shown in FIG. 7.
Figure 9:
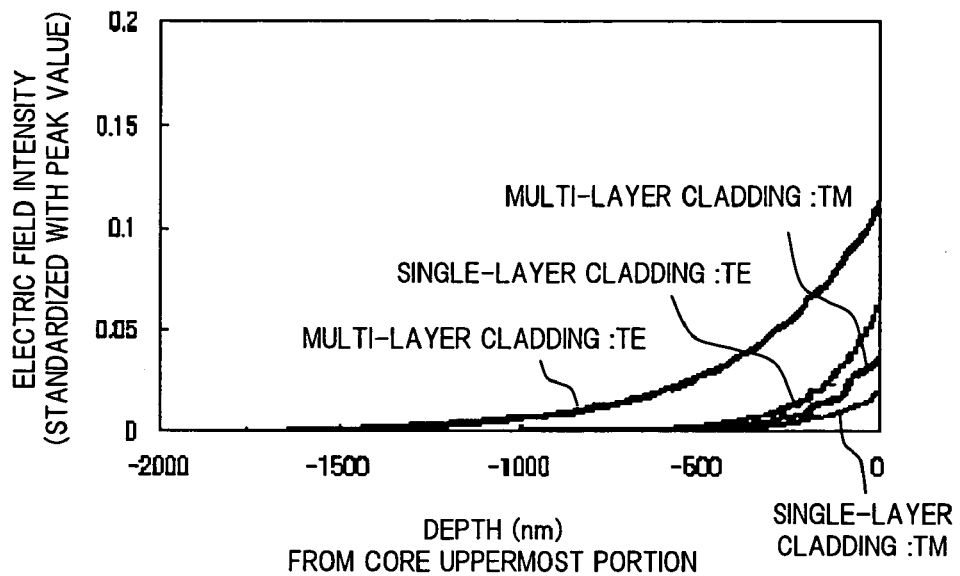
FIG. 9 is a graph showing an enlarged cladding portion in the field distribution profile in each of FIG. 6 and FIG. 8.

In comparison with the above first and second setting conditions, the consideration is made of the case where the cladding is a single-layer film of $SiO_2$ as shown in FIG. 7. FIG. 8 shows a result in which the field distribution profile in the optical waveguide to which the single-layer cladding is applied is simulated by the two-dimensional slab model. Also in this case, the leakage of the electric field out to the single-layer cladding is larger in the TE mode than in the TM mode. However, as shown in FIG. 9 which shows the enlarged cladding portion of the field distribution profile in each of FIG. 6 and FIG. 8, a difference of the leakage of the electric field out to the cladding between the TE mode and the TM mode is larger in the case where the multi-layer cladding is used than in the case where the single-layer cladding is used. Thus, it can be understood that, by adopting the multi-layer cladding, the polarization dependence of the field distribution profile is larger than that in the case where the single-layer cladding is adopted.

Here, there will be described in detail a relation between the lamination cycle D of the multi-layer cladding 20 and the polarization dependence of the optical waveguide.

Figure 10:
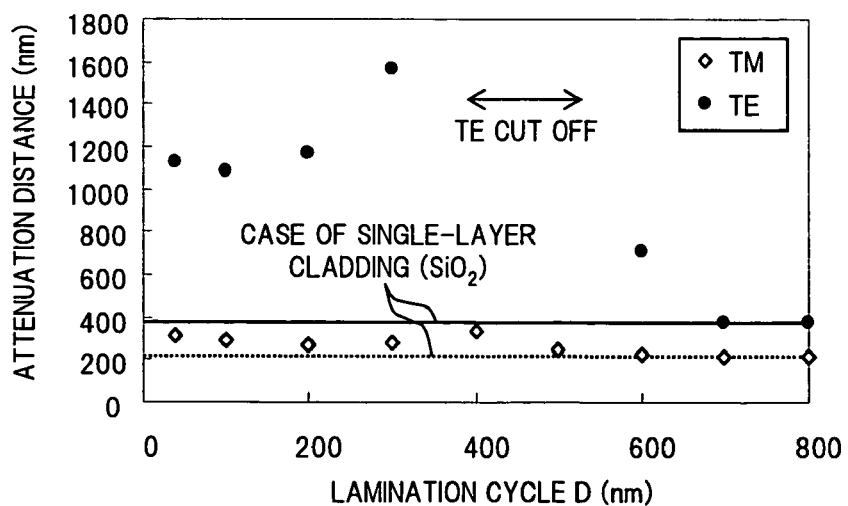
FIG. 10 is a graph showing a relation between the lamination cycle and a distance to which the electric field intensity reaches 0.5% or less of a peak value in the multi-layer cladding.

FIG. 10 shows one example which shows a relation between the lamination cycle D and a distance (the cladding thickness) during which the electric field intensity (an amplitude value) reaches 0.5% or less (45 dB or less in the power) of the peak value within the multi-layer cladding 20.

From FIG. 3, it is understood that the effective refractive index is increased as the lamination cycle D is increased, so that the confining in the optical waveguide is weakened, and a relation between an attenuation distance and the lamination cycle D shown in FIG. 10 is also in conformity with this, so that the leakage of the TE mode is increased with the increase of the lamination cycle D and the TE mode is cut off at 300 nm or more of the lamination cycle D. However, once the lamination cycle D is increased by a certain level or above, the effect by the multi-layer cladding 20 formed by laminating the Si layers and the $SiO_2$ layers is lost, and there is no difference from the case where the $SiO_2$ single-layer cladding is adopted. This is because the film thickness of the $SiO_2$ layer of the multi-layer cladding 20 is larger than the leakage distance (TE; about 200 nm and TM: about 400 nm) of the light in the case where the cladding is the $SiO_2$ single-layer film, and therefore, the light being propagated through the optical waveguide does not sense the multi-layer effect (the existence of the high refractive index layer 21). Accordingly, in order to achieve the effect of the present invention, the lamination cycle D of the multi-layer cladding 20 needs to be smaller than the leakage distance of the TE mode in the case where the single-layer cladding using the material of the lowest refractive index among the materials configuring the multi-layer cladding 20 is assumed.

Figure 11:
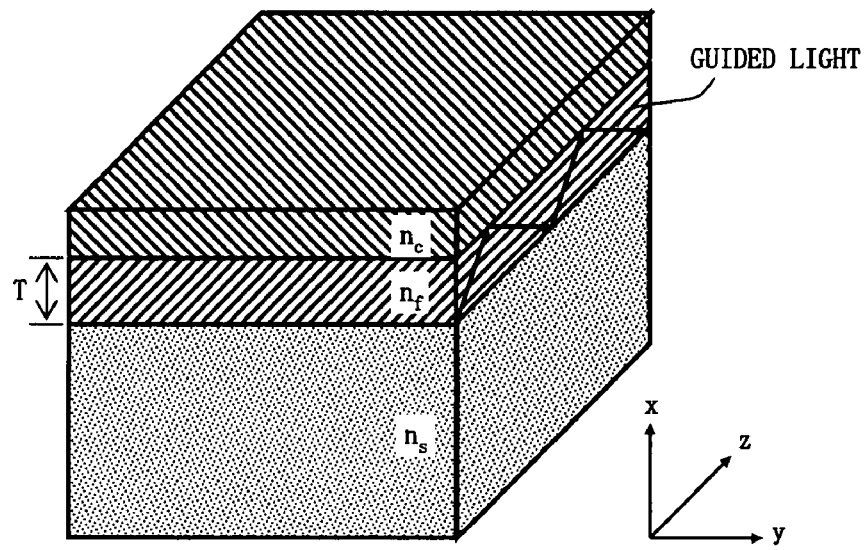
FIG. 11 is a diagram showing a three-layered slab waveguide used for explaining a leakage distance of the light out to the cladding.

Incidentally, it is possible to quantitatively estimate the above described "leakage distance" in accordance with the relational equations shown in the followings in the case where a three-layer slab waveguide as shown in FIG. 11 for example is assumed. Firstly, in the three-layer slab waveguide of FIG. 11, a lamination direction of each layer is an x-direction, a propagation direction of guided light is a z-direction, and an intermediately positioned waveguide layer has the refractive index of $n_f$ and the thickness of T. Further, the refractive index of a substrate layer positioned on a lower side is $n_s$, and the refractive index of a cladding layer positioned on an upper side is $n_c$. In such a three-layer slab waveguide, a wave equation for the TE mode is represented by the following equation (2) from the Maxwell equation.

$$\frac{\partial^2 E_y}{\partial x^2} + (k_0^2 n^2 - \Box^2)E_y = 0 \qquad (2)$$

$$H_x = -\frac{\Box}{\Box\mu_0}E_y$$

$$H_z = -\frac{1}{j\Box\mu_0}\frac{\partial E_y}{\partial x}$$

Further, a wave equation for the TM is represented by the following equation (3).

$$\frac{\partial^2 H_y}{\partial x^2} + (k_0^2 n^2 - \Box^2)H_y = 0 \qquad (3)$$

$$E_x = \frac{\Box}{\Box\varepsilon_0 n^2}H_y$$

$$E_z = \frac{1}{j\Box\varepsilon_0 n^2}\frac{\partial H_y}{\partial x}$$

It is possible to obtain the electric field distribution in each layer based on the above wave equations, and the electric field for the case of the TE mode is represented by the following equation (4).

$E_y = E_c \exp(-\gamma_c x), x>0$ (cladding layer)

$E_y = E_f \cos(k_x x + \phi_c), -T<x<T$ (waveguide layer) ... (4)

$E_y = E_s \exp\{-\gamma_s(x+T)\}, x<-T$ (substrate layer))

In the above equation (4), if the propagation constant of each layer in the x-direction is represented using the equivalent refractive index N (effective index) of the mode being propagated through the waveguide layer, the following equation (5) is obtained.

$$\gamma_c = k_0\sqrt{N^2+n_c^2},\ k_x = k_0\sqrt{n_f^2+N^2},\ \gamma_s = k_0\sqrt{N^2+n_s^2}\ldots \qquad (5)$$

Incidentally, it is provided that the equivalent refractive index N is defined by $N = n_f \sin\theta$ provided that an incident angle of the light is θ, and a relation of $n_c$, $n_s$<N<$n_f$ is established. Further, $k_0$ is represented by $k_0=2\pi/\lambda$ provided that an optical wavelength in the free space is λ.

Figure 12:
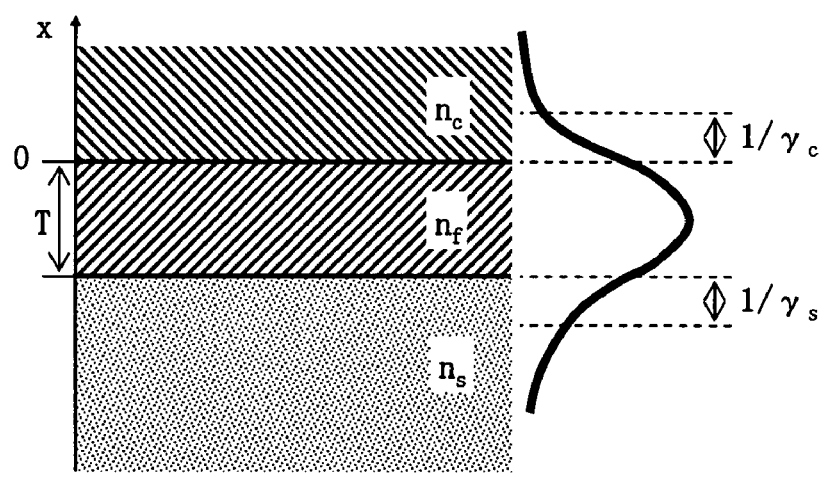
FIG. 12 is a diagram explaining that the leakage distance of the light out to the cladding corresponds to $1/\gamma_c$.

From the relation in each of the equations (4) and (5), it is understood that the light is attenuated in the cladding layer and in the substrate layer (evanescent wave), and attenuation constants thereof correspond to $\gamma_c$ and $\gamma_s$, respectively. Therefore, as shown in FIG. 12, considering a distance to which the electromagnetic field amplitude (square-root of the intensity) on the interfacial boundary between the waveguide layer and the cladding layer is attenuated to 1/e (e is the base of natural logarithm), such a distance corresponds to $1/\gamma_c$, and if this distance is defined as the "leakage distance" of the TE mode out to the cladding, it is possible to roughly estimate the "leakage distance" using the above $\gamma_c$.

To be specific, in the field distribution for the case where the single-layer cladding of $SiO_2$ shown in FIG. 8 and FIG. 9 is disposed, the TE mode leaks out to the single-layer cladding in a range of about 500 nm. The value of $1/\gamma_c$ obtained using the above equation (5) in this case is about 150 nm. Incidentally, N=2.2054 obtained by the simulation is used for the equivalent refractive index N, and the refractive index $n_c$ of the cladding is 1.46. From the above result, it is possible to approximately estimate the distance (the leakage distance) during which the light is sufficiently attenuated in the cladding as about three times of $1/\gamma_c$. However, the estimating method of the leakage distance is not limited to the above specific example.

Next, there will be described in detail the leakage amount of the light out to the multi-layer cladding 20.

Figure 13:
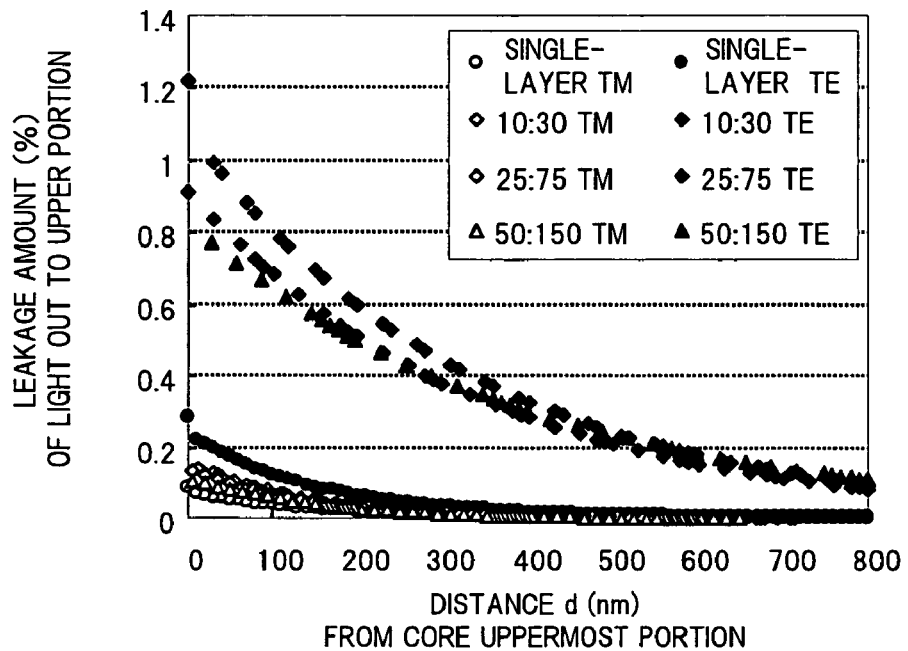
FIG. 13 is a graph showing one example obtained by calculating a leakage amount of the light out to the multi-layer cladding according to a distance from the uppermost portion of the core.
Figure 14:
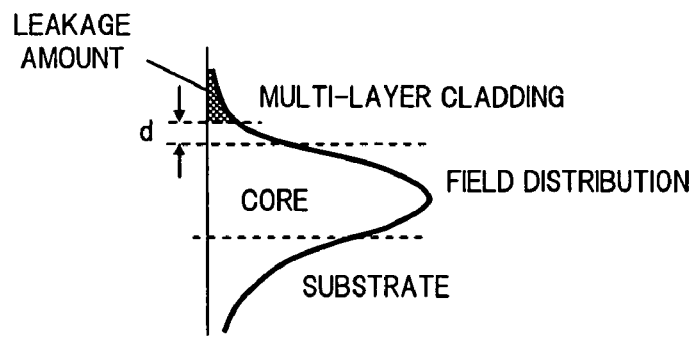
FIG. 14 is a graph for explaining the definition of the leakage amount.

FIG. 13 shows one example in which a leakage amount of a light out to a sufficiently thick multi-layer cladding in which the Si layers and the $SiO_2$ layers are laminated in the possession rates $f_1:f_2=0.25:0.75$, is calculated according to a distance from a core uppermost portion. Note, as shown in FIG. 14, for the leakage amount of the light in the above calculation, an attention is made on the site which is apart from the core uppermost portion in the multi-layer cladding by a distance d (nm), and an amount of the light leaking out to a portion above the site (in a direction away from the core) is defined as the proportion (%) for when an integral value of the entire field distribution is 1. Further, in FIG. 13, there are shown calculation results (to be specific, three film thickness combinations of the Si layer and the $SiO_2$ layer (10 nm, 30 nm), (25 nm, 75 nm) and (50 nm, 150 nm)) in the case where the film thickness of each of the Si layer and the $SiO_2$ layer is changed in the fixed possession rate, together with a calculation result for the case where the cladding is the $SiO_2$ single-layer film.

From the calculation results in FIG. 13, it is apparent that, by adopting the multi-layer cladding, the polarization dependence of the leakage amount of the light is significantly increased in comparison with the case of the $SiO_2$ single-layer cladding. Further, it is understood that a large difference does not occur between the leakage amounts of the TE and TM polarization modes, even if the film thickness of each of the Si layer and the $SiO_2$ layer is changed in the fixed possession rate. Since this means that the tolerance of the lamination cycle D is sufficiently large, the film thickness control for when the multi-layer cladding 20 is produced can be easily performed.

In the description of the optical waveguide to which the above multi-layer cladding 20 is applied, the consideration is made on the case where the multi-layer cladding 20 has the sufficient thickness in comparison with the magnitude of the polarization mode. However, in an actual device, since the total film thickness of the multi-layer cladding 20 has a finite value, a confining condition of the light is changed. However, it can be considered that the leakage amount of the light out to an outside (the air space) in the case where the multi-layer cladding 20 is thin, is approximately proportional to the leakage amount of the light out to the multi-layer cladding 20 having the sufficient thickness.

Further, strictly speaking, the above effective refractive index of the multi-layer film is only established in the case where the multi-layer film lamination is infinitely repeated. However, it is apparent from simulation results shown in next FIG. 15 to FIG. 18 that the effect of increasing the polarization dependence of the optical waveguide by applying the multi-layer cladding 20 has been sufficiently achieved even if the number of lamination cycles of the multi-layer cladding 20 is one cycle (two layers).

Figure 15:
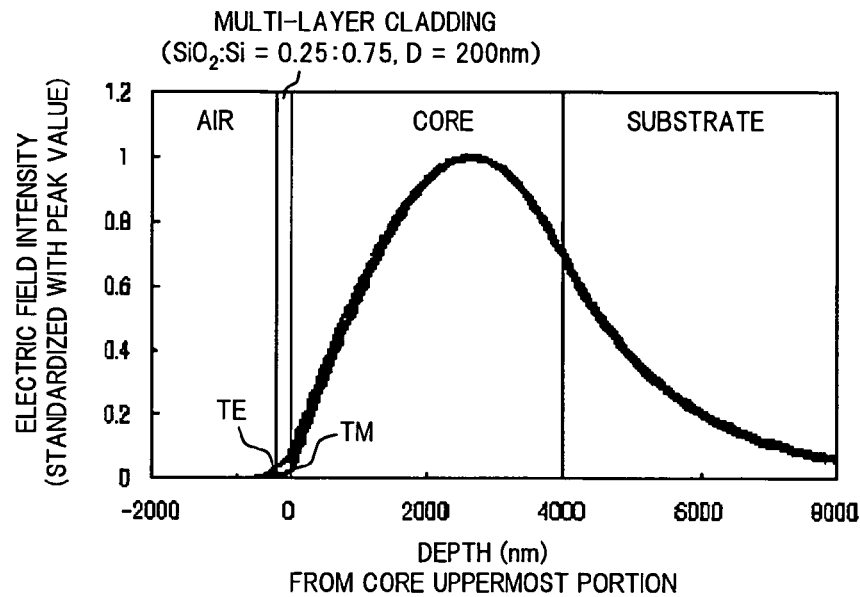
FIG. 15 is a graph showing a field distribution profile in the case where a two-layer cladding is disposed on the LN waveguide.
Figure 16:
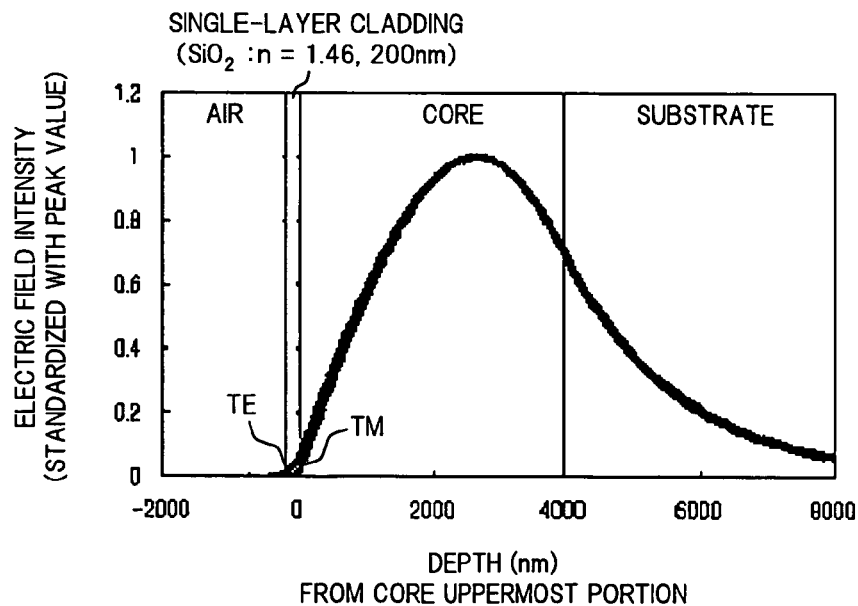
FIG. 16 is a graph showing a field distribution profile in the case where a cladding consisting of $SiO_2$ single-layer is disposed on the LN waveguide.
Figure 17:
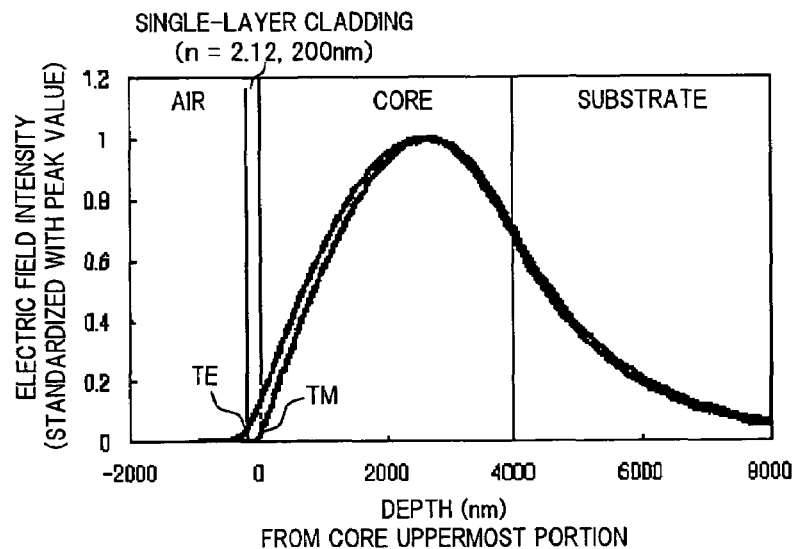
FIG. 17 is a graph showing a field distribution profile when a single-layer cladding having the effective refractive index on the assumption of a multi-layer film of finite thickness.
Figure 18:
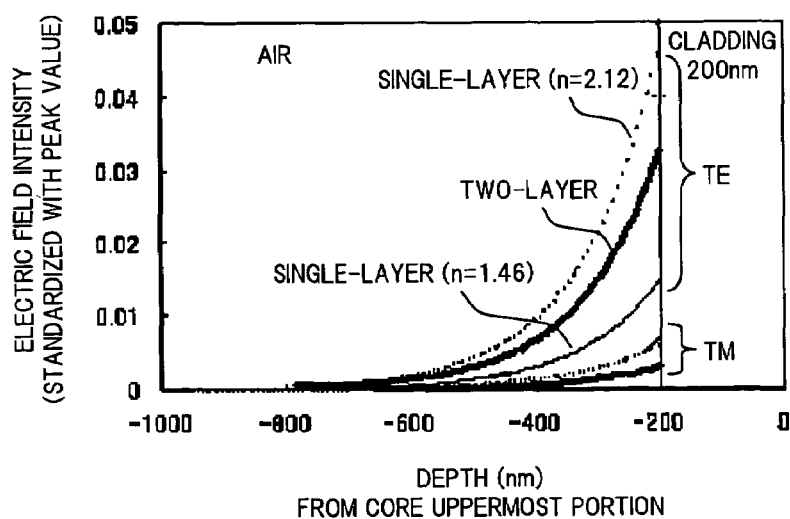
FIG. 18 is a graph showing the enlarged air space portion in the distribution profile in each of FIG. 15 to FIG. 17.

FIG. 15 shows the field distribution profile for the case where the $SiO_2$ layer of 150 nm film thickness is formed on the LN waveguide and the Si layer of 50 nm thickness is laminated on the $SiO_2$ layer, to thereby dispose a cladding of two layers (the possession rates of the Si layer and the $SiO_2$ layer are $f_1:f_2=0.25:0.75$, and the lamination cycle D is one cycle of 200 nm). Further, FIG. 16 shows the field distribution profile for the case where a cladding consisting of the $SiO_2$ single-layer film (200 nm thickness) is disposed. Furthermore, FIG. 17 shows the field distribution profile for the case where there is disposed a single-layer cladding of 200 nm thickness having the effective refractive index (n=2.12) in the case of assuming the multi-layer film of infinite thickness. In addition, FIG. 18 is a graph in which a portion (the air space) above the cladding is enlarged in order to easily understand differences among FIG. 15 to FIG. 17.

From FIG. 15 to FIG. 18, it is understood that although the leakage of the light out to the air space in the case where the two-layer cladding is applied is less than that in the case where the single-layer cladding having the effective refractive index of the multi-layer film of infinite thickness, by applying the multi-layer (two-layer) cladding, the polarization dependence of the field distribution profile is larger than that in the case of the $SiO_2$ single-layer cladding is applied, and therefore, the leakage of the TE mode is increased.

Here, there will be additionally described the leakage amount of the light out to the air space in the case where the film thickness of the multi-layer cladding is finite.

Figure 19:
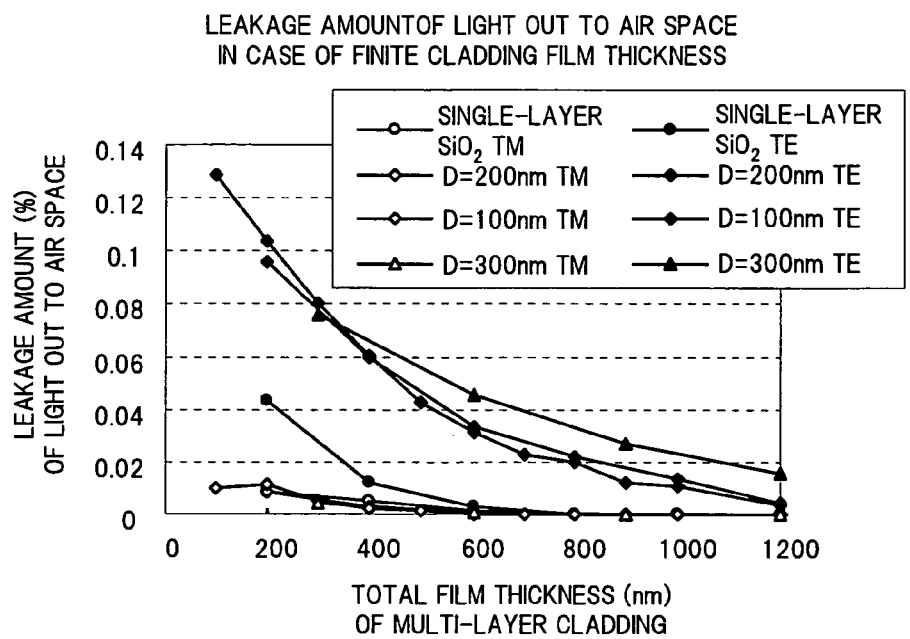
FIG. 19 is a graph showing a calculation result of the leakage amount of the light out to the air space in the case where the film thickness of the multi-layer cladding is finite.

FIG. 19 shows calculation results of changes in the leakage amounts out to the air space for the case where, for the respective multi-layer claddings which are formed by laminating the Si layer and the $SiO_2$ layer in the possession rates f1:f2=0.25:0.75 and the lamination cycles D=100 nm, 200 nm and 300 nm, the total film thickness (the number of lamination cycles) of each cladding is changed. It is understood that, in each multi-layer cladding, although the leakage amount of the TM mode is approximately same as that in the $SiO_2$ single-layer film, the leakage amount of the TE mode is sufficiently larger than that in the $SiO_2$ single-layer film even if each of these multi-layer claddings corresponds to the two-layer cladding of which total film thickness equals to the lamination cycle D, and therefore, has the large correlation with the leakage amount of the light in the case where the total film thickness of the multi-layer cladding is assumed to be sufficiently thick (FIG. 13).

In the case of realizing an optical waveguide utilizing the multi-layer cladding of finite film thickness as described above, if an optical absorbing material such as a metal or the like is arranged on the multi-layer cladding, the TE mode largely leaked out to the outside of the multi-layer cladding in comparison with the TM mode suffers a larger absorption loss by the optical absorbing material. However, considering the total film thickness of the multi-layer cladding from a view point of the realization of a low loss polarizer (from a view point that a loss of necessary polarization is avoided as much as possible), it is desirable to set the total film thickness capable of sufficiently attenuating the TM mode in the multi-layer cladding, and under the condition shown in FIG. 19, the total film thickness is desirable to be set at about 600 nm.

The optical waveguide device (waveguide type polarizer) applied with the multi-layer cladding as described in the above is similar to a conventional waveguide type polarizer which is produced by a method using a birefringent material for the cladding, but has large merits in that the multi-layer cladding 20 can be formed using arbitrary materials which satisfies a relative relation to the refractive index of the core 11, and also, the multi-layer cladding 20 can be realized with the simple producing process. Further, in the case where an optical waveguide structure using this multi-layer cladding is applied to an optical modulator, since a buffer layer arranged between the optical waveguide and an electrode may be simply replaced with the above multi-layer cladding, the new process does not need to be introduced, and also, various characteristics (the chip length, an insertion loss, the drive voltage and the like) of a conventional optical modulator are not degraded.

Figure 29:
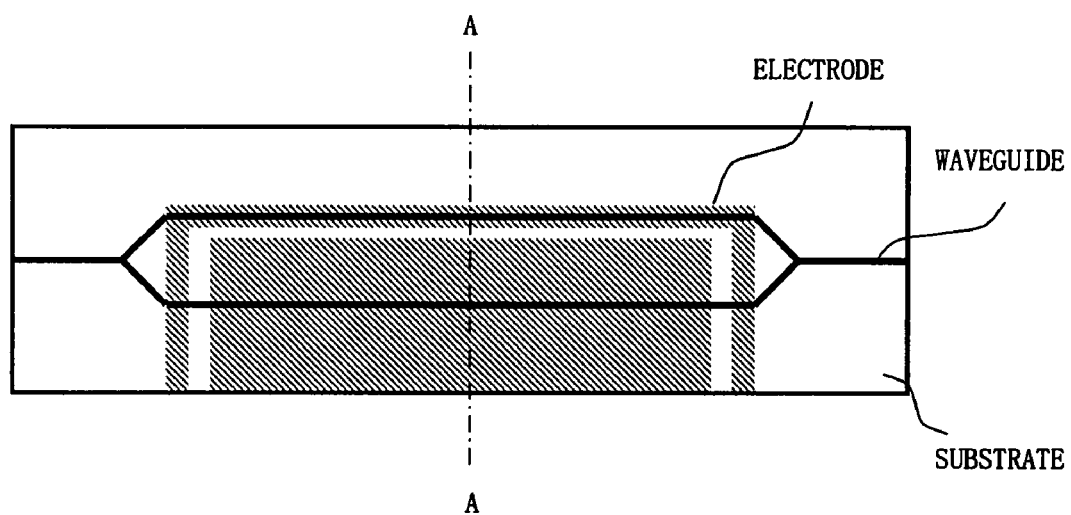
FIG. 29 is a diagram showing one example of a structure of a typical LN optical modulator.
Figure 29:
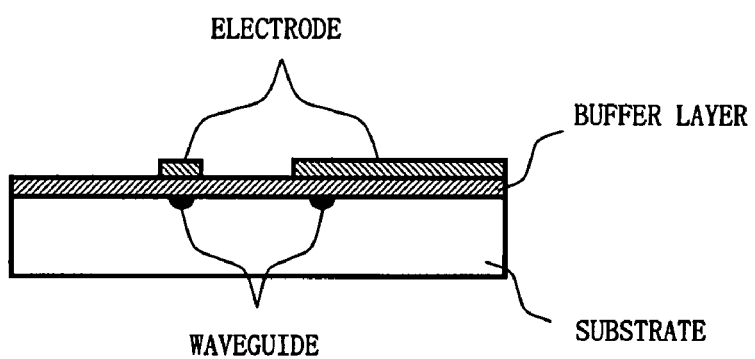
Figure 30:
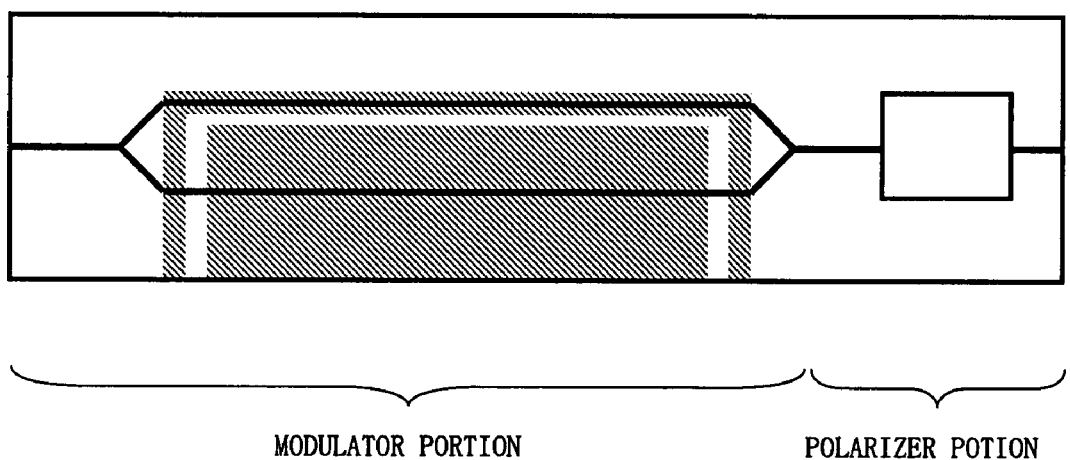
FIG. 30 is a diagram for explaining problems in the case where a waveguide type polarizer according to a conventional method is applied to a LN optical modulator.
Figure 30:
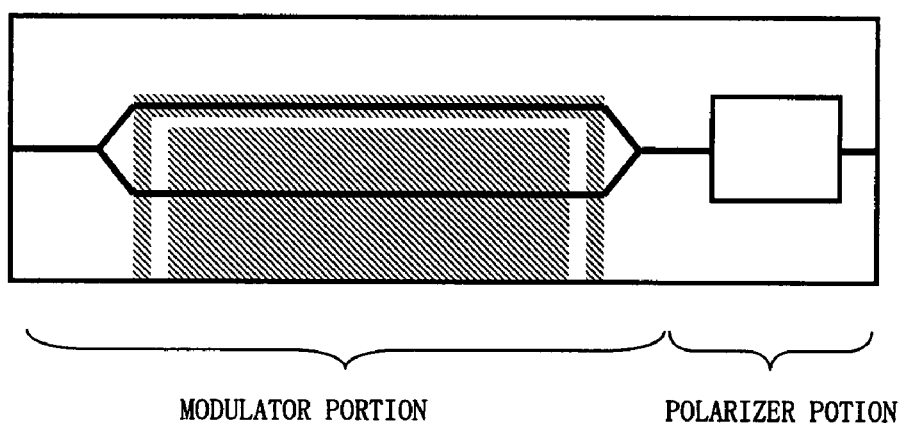

To be specific, in the optical waveguide according the first setting condition, the waveguide type polarizer through which only the TE mode is propagated can be realized. Therefore, by applying this waveguide type polarizer to a LN optical modulator as shown in FIG. 29, that is, by making the buffer layer of the LN optical modulator to have the multi-layer structure similar to the above multi-layer cladding 20, the LN optical modulator of high polarization-extinction ratio can be realized.

Further, in the optical waveguide according to the second setting condition, if the film thickness of the multi-layer cladding 20 is set at the thickness by which the TM mode is sufficiently attenuated and also the TE mode is cut off during the attenuation, by utilizing the large leakage of the TE mode, and an optical absorber is disposed on the multi-layer cladding 20, a waveguide type polarizer for selectively attenuating only the TE mode can be realized. By applying this waveguide type polarizer to the LN optical modulator similarly to the case of the first setting condition, it is possible to realize the LN optical modulator of high polarization-extinction ratio. In the case of the LN optical modulator applied with the optical waveguide according to the second setting condition, since the thickness of the multi-layer structured buffer layer becomes thinner, the LN optical modulator can be driven by a lower drive voltage. Further, it is also possible to utilize an electrode applied with the drive voltage as the above optical absorber.

Next, there will be described specific embodiments of the optical waveguide device according to the present invention.

Figure 20:
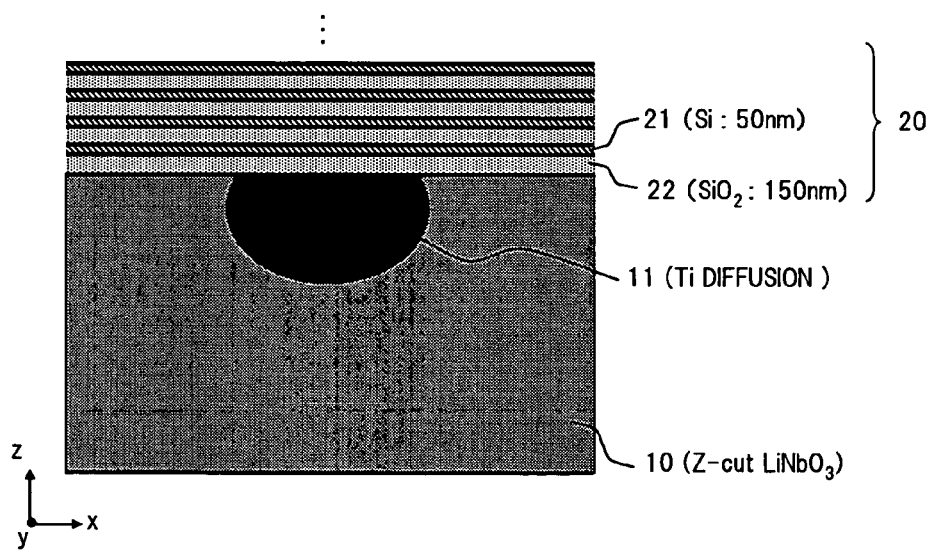
FIG. 20 is a cross section view showing a configuration of a first embodiment of the optical waveguide device according to the present invention.
Figure 20:
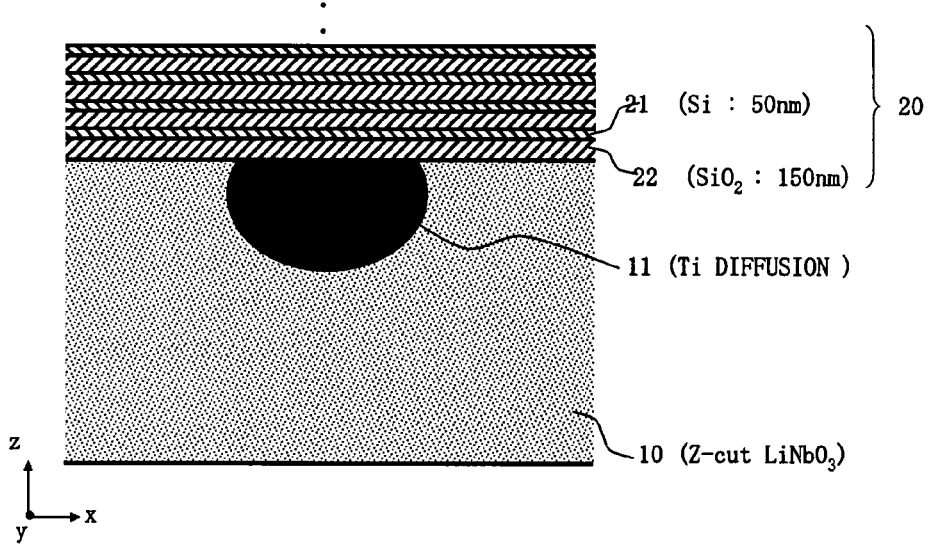

FIG. 20 is a cross section view showing a configuration of a first embodiment of the optical waveguide device according to the present invention.

In the first embodiment, a waveguide type polarizer is realized such that the core 11 is formed on the LiNbO$_3$ substrate 10 of z-cut by the Ti diffusion, and the high refractive index layer 21 using Si and the low refractive index layer 22 using SiO$_2$ are laminated on the core 11 in the possession rates f1:f2=0.25:0.75 and the lamination cycle D=200 nm (namely, the Si layer film thickness d1=50 nm and the SiO$_2$ layer film thickness d2=150 nm) with the SiO$_2$ layer as the lowermost layer.

Figure 21:
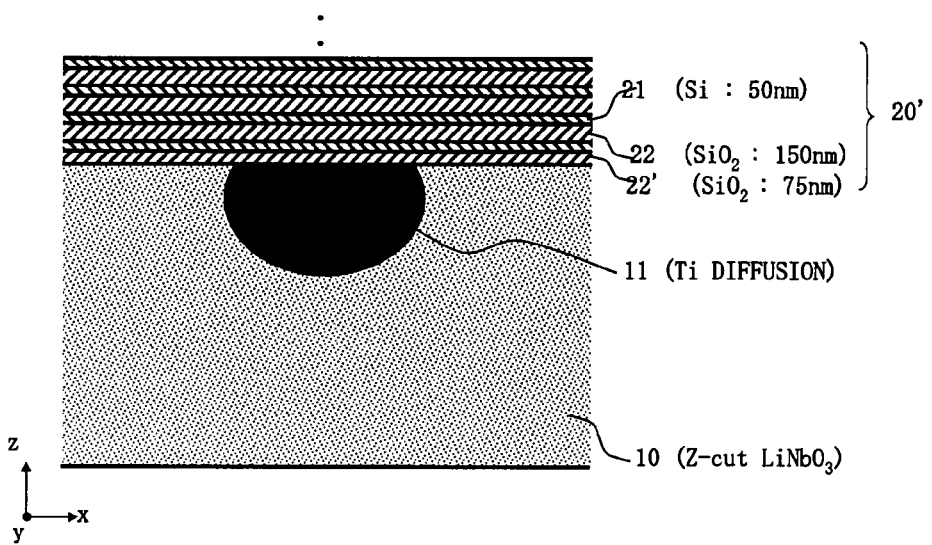
FIG. 21 is a cross section view showing a configuration of a second embodiment of the optical waveguide device according to the present invention.
Figure 21:
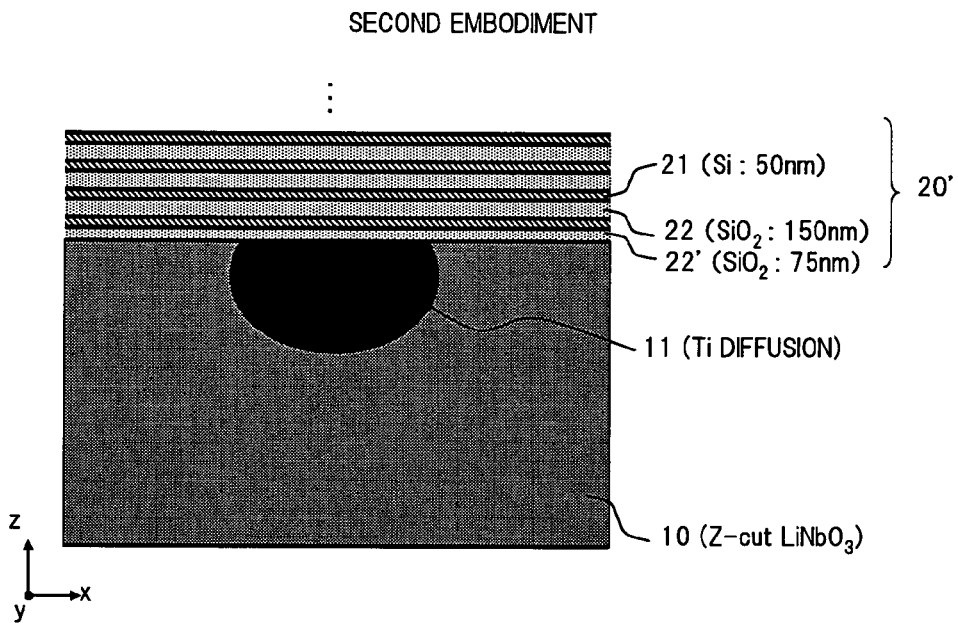

FIG. 21 is a cross section view showing a configuration of a second embodiment of the optical waveguide device according to the present invention.

Figure 22:
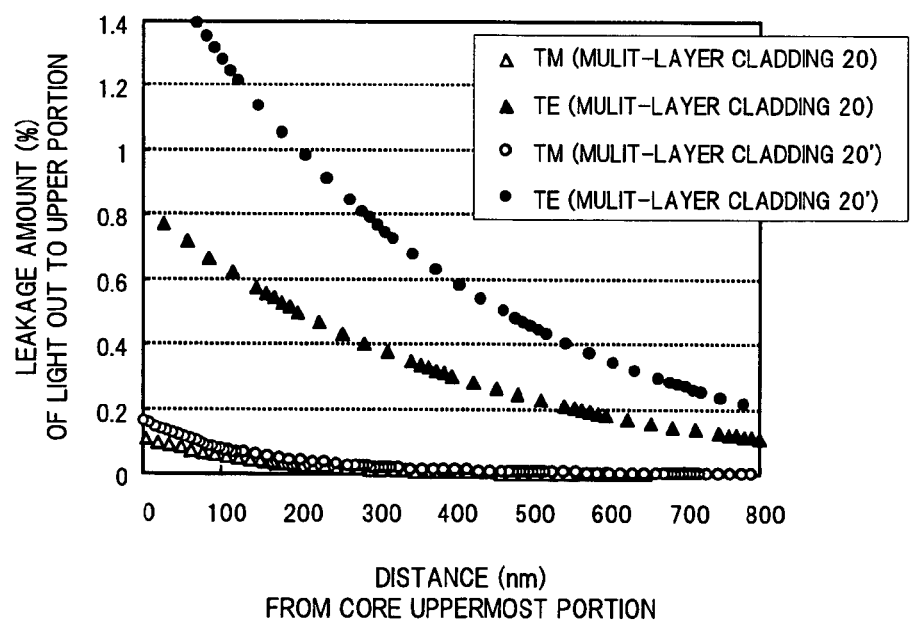
FIG. 22 is a graph showing a simulation result of a leakage amount of a light in each of the first and second embodiments.

The second embodiment is an application example of the configuration of the first embodiment, in which there is disposed a multi-layer cladding 20' formed by making only the lowermost layer (SiO$_2$ layer) 22' film thickness of the multi-layer cladding 20 to be different from the film thickness of each of the remaining SiO$_2$ layers (ideally, ½). By differentiating the film thickness of a connecting portion of the multi-layer cladding to the core, as shown in a simulation result of the leakage amount of the light shown in FIG. 22, an effect that the leakage amount of the TE mode out to the multi-layer cladding is increased, can be achieved. This is because, if the film thickness of the connecting portion is changed, the solution (electromagnetic field distribution profile) satisfying a boundary condition (tangential components between the electric field and the magnetic field continuing at the boundary of each layer) is changed, so that the electromagnetic field at the core and cladding boundary portion (between the core 11 and the multi-layer cladding 20') is mostly strengthened, when the film thickness of the connecting portion is half.

Figure 23:
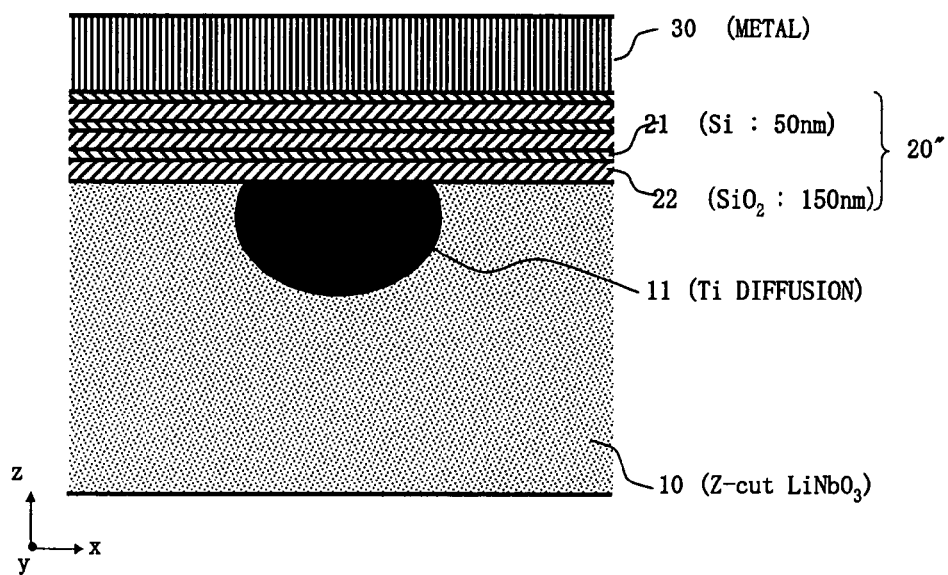
FIG. 23 is a cross section view showing a configuration of a third embodiment of the optical waveguide device according to the present invention.

FIG. 23 is a cross section view showing a configuration of a third embodiment of the optical waveguide device according to the present invention.

Figure 24:
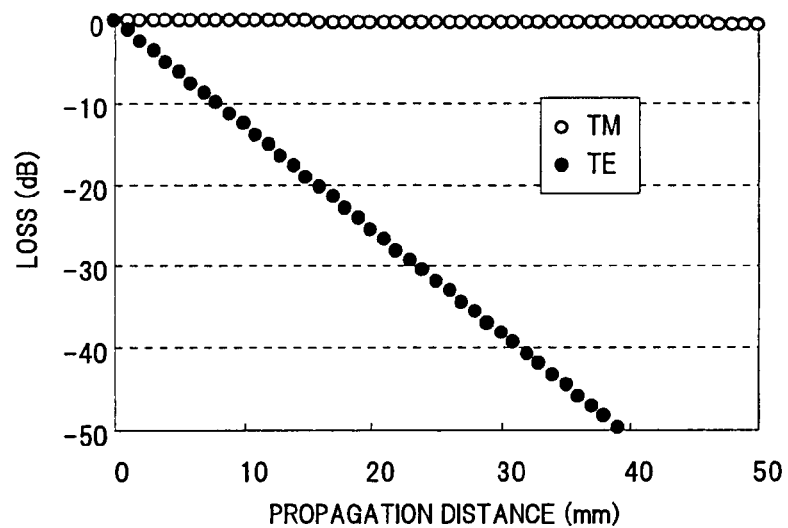
FIG. 24 is a graph showing a calculation result of a propagation loss of each polarization mode in the third embodiment.

The third embodiment is a modified example of the configuration of the first embodiment shown in FIG. 20, in which there is disposed a multi-layer cladding 20" formed by terminating the total film thickness of the multi-layer cladding 20 at 600 nm (namely, three cycles), and a metal layer 30 is formed on the multi-layer cladding 20". A propagation loss to the respective TE and TM polarization modes in the configuration of this third embodiment can be calculated, by utilizing an experiment result for the case where the cladding is the SiO$_2$ single-layer film (similarly to the multi-layer cladding 20", the film thickness of the single-layer cladding is 600 nm and the propagation loss to the TE and TM modes is about 0.1 dB/cm) and by considering that the propagation loss is in proportion to the leakage amount of the light. One example of calculation results is shown in FIG. 24. From the calculation result in FIG. 24, it is understood that the polarization-extinction ratio of about 40 dB can be realized in the propagation distance of about 30 mm. Further, it is also understood that the propagation loss of the TM mode at the time is about 0.1 dB/cm and accordingly, is sufficiently small. Accordingly, by the configuration of the third embodiment, it is also possible to realize the waveguide type polarizer capable of guiding only the TM mode at the low loss.

Figure 25:
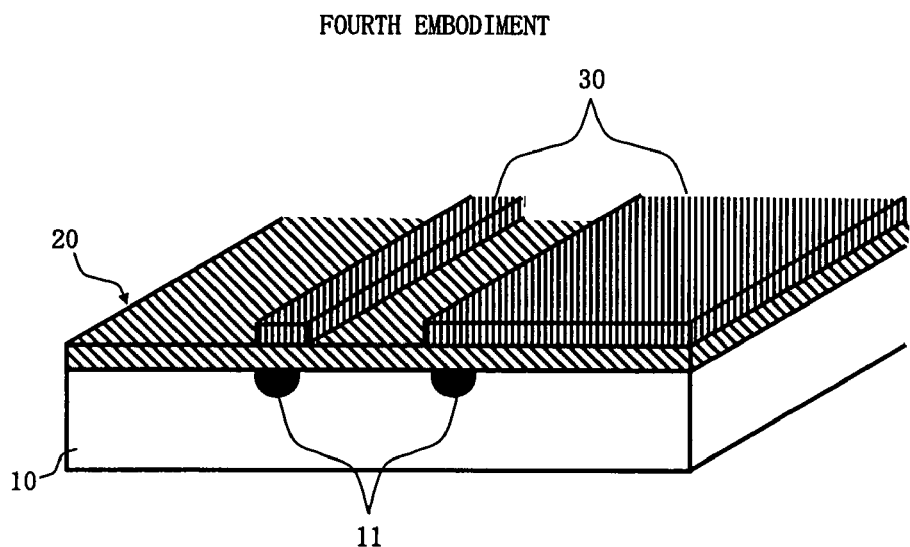
FIG. 25 is a cross section view showing a configuration of a fourth embodiment of the optical waveguide device according to the present invention.

FIG. 25 is a diagram showing an essential part configuration of a fourth embodiment of the optical waveguide device according to the present invention.

In the fourth embodiment, the structure of the multi-layer cladding in any one of the first to third embodiments is applied to the buffer layer of the typical LN optical modulator shown in FIG. 29. The configuration of the LN optical modulator according to the fourth embodiment differs from the conventional LN optical modulator only in that the buffer layer has the multi-layer structure satisfying the conditions of the present invention. Therefore, since the LN optical modulator of the configuration as shown in FIG. 25 can be realized by only performing the producing process modification in which the buffer layer which has been produced by the single-layer sputtering is formed by the multi-target sputtering, the producing cost thereof is not much different from that of the conventional LN optical modulator. Further, from the calculation result shown in FIG. 24, in order to realize the high polarization-extinction ratio by the application of the multi-layer structured buffer layer, the relatively long propagation distance (about a few centimeters) is necessary. However, in the typical LN optical modulator, the electrode is arranged on the optical waveguide via the buffer layer and the length thereof is normally 30 mm or above. Therefore, the buffer layer formed under the electrode is made to have the multi-layer structure, so that the sufficiently high polarization-extinction ratio can be realized. To be specific, by making the buffer layer to have the multi-layer structure by the Si layers and the $SiO_2$ layers, it becomes possible to improve the polarization-extinction ratio of the LN optical modulator to 40 dB or above.

Figure 26:
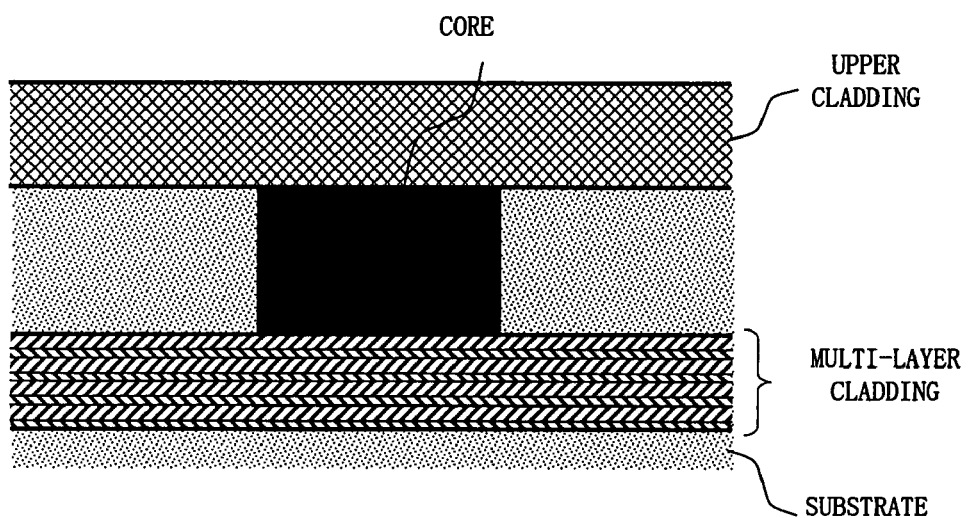
FIG. 26 is a cross section view showing a configuration example in which the multi-layer cladding is arranged under the core.
Figure 27:
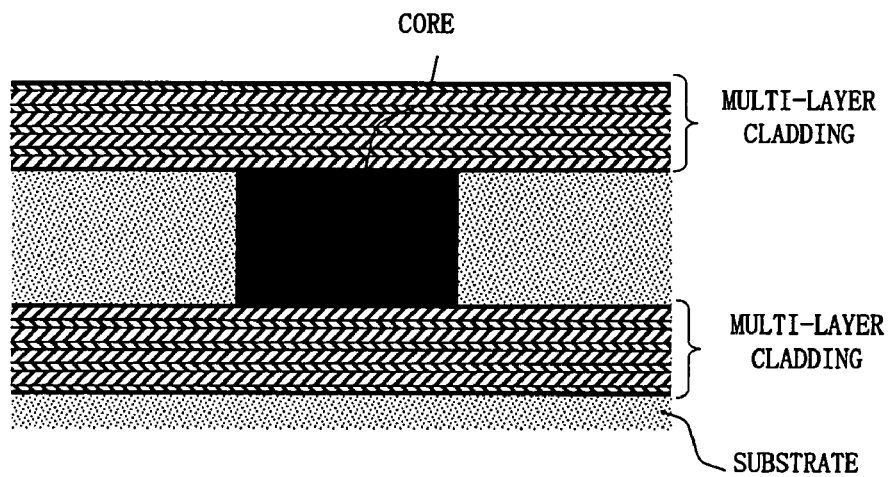
FIG. 27 is a cross section view showing a further configuration example in which the multi-layer claddings are arranged on and under the core.
Figure 28:
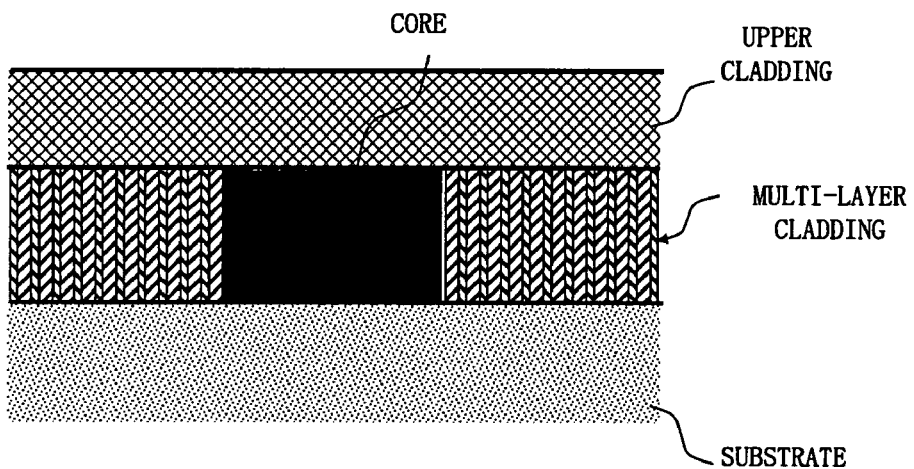
FIG. 28 is a cross section view showing a still further configuration example in which the multi-layer claddings are arranged on right and left sides of the core.

In each of the above first to fourth embodiments, there has been shown the configuration example in which the multi-layer cladding (multi-layer structured buffer layer) is disposed on the core formed in the vicinity of the substrate surface. However, the arrangement of the multi-layer cladding in the present invention is not limited to the above example. As shown in a cross section view of FIG. 26 for example, if the multi-layer structure is applied to a lower cladding arranged under the core, it is also possible to achieve an effect similar to that in each of the above embodiments. Further, as shown in a cross section view of FIG. 27 for example, it is also possible to apply the multi-layer structure to both of claddings arranged on and under the core, and in this case, the polarization dependence of the optical waveguide can be further increased. Furthermore, as shown in a cross section view of FIG. 28 for example, the multi-layer structure in which the low refractive index layers and the high refractive index layers are alternately formed in a direction away from the core, may be applied to claddings arranged on right and left sides of the core. Such a configuration is effective for the optical waveguide device using the LN substrate of x-cut for example to have a function as a polarizer.

Further, in each of the above first to fourth embodiments, there has been described the case where Si is used as the material for the high refractive index layer of the multi-layer cladding and $SiO_2$ is used as the material for the low refractive index layer thereof. However, the materials of the multi-layer cladding in the present invention are not limited to the above example, and it is possible to appropriately select the materials of the respective layers according to the refractive index of the core. For example, even in the case where $SiO_2$ doped with impurities as disclosed in Japanese Patent No. 3001027 is used in place of $SiO_2$, a similar effect can be achieved.

Furthermore, in each of the above first to fourth embodiments, the film thickness ratio of each layer in the multi-layer cladding (except for the lowermost layer in the second embodiment) is fixed. However, the film thickness ratio in the multi-layer cladding may be changed so that the effective refractive index is distributed. In addition, it is also possible to make an application in which the low refractive index layer or the high refractive index layer is made to be further multi-layered so that layers of three or more types are laminated as one cycle, to thereby form the multi-layer cladding.

What is claimed is:

1. A device provided with an optical waveguide comprising:
    a core formed on a substrate having a relatively high refractive index; and
    a cladding arranged to cover said core and having a relatively low refractive index,
    wherein said cladding includes a multi-layer structure portion which is formed by laminating, in a direction away from said core, one or more low refractive index layers formed using a material with a refractive index lower than that of said core and one or more high refractive index layers formed using a material with a refractive index higher than that of said core, and a lamination cycle of said low refractive index layer and said high refractive index layer in said multi-layer structure portion set to be shorter than a distance to which a polarization mode for guiding said core leaks out to a single-layer cladding on the assumption that said single-layer cladding is formed using the material constituting said low refractive index layer.

2. A device according to claim 1,
    wherein the lamination cycle, said low refractive index layer and said high refractive index layer in the multi-layer structure portion of said cladding, and a film thickness ratio thereof, are set so that the effective refractive index to one of orthogonal polarization modes of a light incident on the optical waveguide is lower than the refractive index of said core, and the effective refractive index to the other polarization mode is higher than the refractive index of said core.

3. A device according to claim 1
    wherein the lamination cycle of said low refractive index layer and said high refractive index layer in the multi-layer structure portion of said cladding, and a film thickness ratio thereof, are set so that the effective refractive index to each of orthogonal polarization modes of a light incident on the optical waveguide is lower than the refractive index of said core, and
    an optical absorber is provided in the vicinity of an end face of said multi-layer structure portion, which is positioned on an opposite side of said core.

4. A device according to claim 3, wherein said optical absorber is configured using a metal material.

5. A device according to claim 1,
    wherein, in the multi-layer structure portion of said cladding, in the case where said low refractive index layer and said high refractive index layer are laminated in two or more layers respectively, the film thickness of the low refractive index layer which is in contact with said core is different from that of each of the remaining low refractive index layers.

6. An optical modulator comprising:
    a substrate having an electro-optic effect;
    an optical waveguide comprising a core which is formed on said substrate and has the relatively high refractive index, and a cladding which is arranged so as to cover said core and has the relatively low refractive index;
    an electrode arranged in the vicinity of said optical waveguide; and
    a buffer layer which is arranged between said optical waveguide and said electrode to suppress the optical absorption by said electrode, for modulating a light being propagated through said optical waveguide due to the electro-optic effect caused by a drive voltage applied on said electrode,
    wherein said buffer layer has a multi-layer structure in which one or more low refractive index layers formed using a material of the refractive index lower than that of said core and one or more high refractive index layers formed using a material of the refractive index higher than that of said core are laminated in a direction toward said electrode from said core, and a lamination cycle of said low refractive index layer and said high refractive index layer in said multi-layer structure is set to be shorter than a distance to which a polarization mode for guiding said core leaks out to a single-layer buffer on the assumption that said single-layer buffer is formed using the material constituting said low refractive index layer.

7. An optical modulator according to claim 6,
wherein the lamination cycle of said low refractive index layer and said high refractive index layer in said buffer layer of the multi-layer structure, and a film thickness ratio thereof, are set so that the effective refractive index to one of orthogonal polarization modes of the light incident on said optical waveguide is lower than the refractive index of said core, and the effective refractive index to the other polarization mode is higher than the refractive index of said core.

8. An optical modulator according to claim 6,
wherein the lamination cycle of said low refractive index layer and said high refractive index layer in said buffer layer of the multi-layer structure, and a film thickness ratio thereof, are set so that the effective refractive index to each of orthogonal polarization modes of the light incident on said optical waveguide is lower than the refractive index of said core, and
an optical absorber is provided in the vicinity of an end face of said buffer layer, which is positioned on an opposite side of said core.

9. An optical modulator according to claim 8,
wherein said optical absorber is said electrode.

10. An optical modulator according to claim 6,
wherein when said substrate is a lithium niobate substrate, in said buffer layer of the multi-layer structure, $SiO_2$ is used as a material for said low refractive index layer and Si is used as a material for said high refractive index layer.

11. An optical modulator according to claim 7,
wherein when said substrate is a lithium niobate substrate of z-cut, in said buffer layer of the multi-layer structure, the lamination cycle of said low refractive index layer and said high refractive index layer, and the film thickness ratio thereof, are set so that the effective refractive index to a TM mode is lower than the refractive index of said core, and the effective refractive index to a TE mode is higher than that of said core.

12. An optical modulator according to claim 8,
wherein when said substrate is a lithium niobate substrate of z-cut, in said buffer layer of the multi-layer structure, the lamination cycle of said low refractive index layer and said high refractive index layer, and the film thickness ratio thereof, are set so that the effective refractive index to each of a TM mode and a TE mode is higher than that of said core, and
said optical absorber absorbs to attenuate only the TE mode in the TE and TM modes.

13. An optical modulator according to claim 6,
wherein in said buffer layer of the multi-layer structure, in the case where said low refractive index layer and said high refractive index layer are laminated in two or more layers respectively, the film thickness of the low refractive index layer which is in contact with said core is different from that of each of the remaining low refractive index layers.

* * * * *